Nov. 24, 1942.   C. A. THOMAS   2,303,293
DYNAMO-ELECTRIC MACHINE
Filed June 3, 1941

Inventor:
Charles A.Thomas,
by Harry E. Dunham
His Attorney.

Patented Nov. 24, 1942

2,303,293

UNITED STATES PATENT OFFICE 2,303,293

DYNAMOELECTRIC MACHINE

Charles A. Thomas, Fort Wayne, Ind., assignor to General Electric Company, a corporation of New York Application June 3, 1941, Serial No. 396,411

9 Claims. (Cl. 171—312)

My invention relates to dynamo-electric machines and more particularly to cores of magnetic material for such electrical devices.

In cores for electrical devices such as dynamo-electric machines in which components of magnetic flux act in different directions, it has been found desirable to utilize a characteristic of certain magnetic materials to improve the characteristics of the machine by providing a path of lower magnetic reluctance to certain components of magnetic flux and a relatively higher reluctance path to other components of magnetic flux. The grain structure and crystalline arrangement of the magnetic material may greatly affect the reluctance of the material to flux in different directions. These characteristics of magnetic materials have been discussed in detail in U. S. Patent 2,053,162 to R. M. Pfalzgraff, assigned to the assignee of this application and generally may be called the magnetic orientation of the material.

An object of my invention is to provide improved cores for electrical devices having low core losses and improved magnetic properties.

Another object of my invention is to provide an improved dynamo-electric machine having an excitation system including a core of magnetic material arranged to provide improved magnetic properties to the machine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
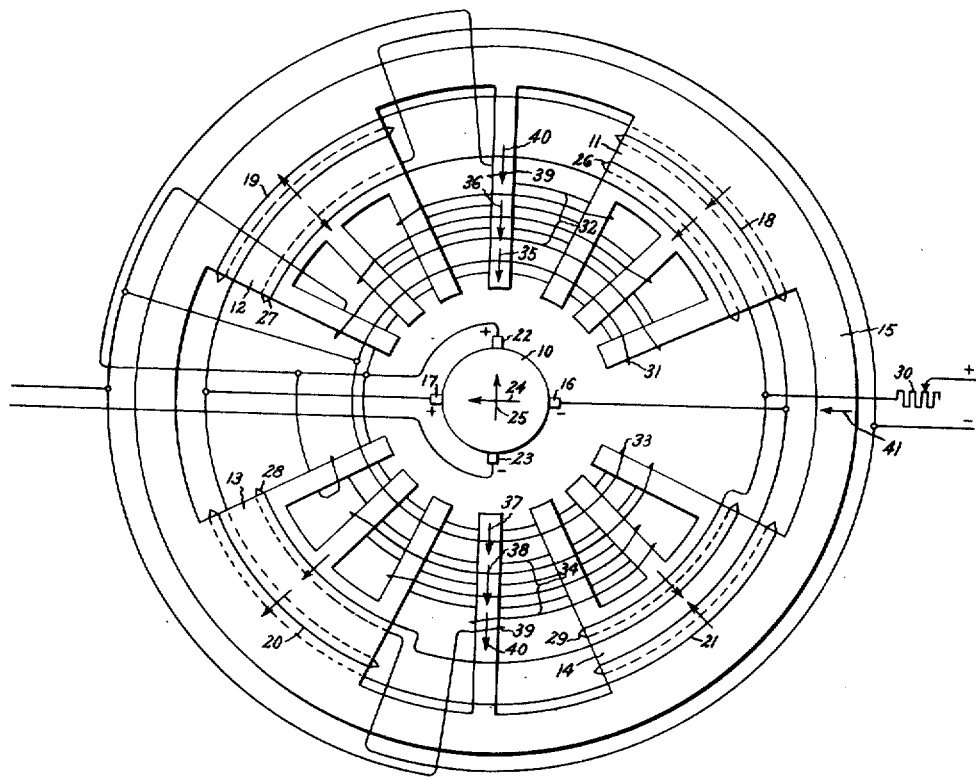
Figure 2:
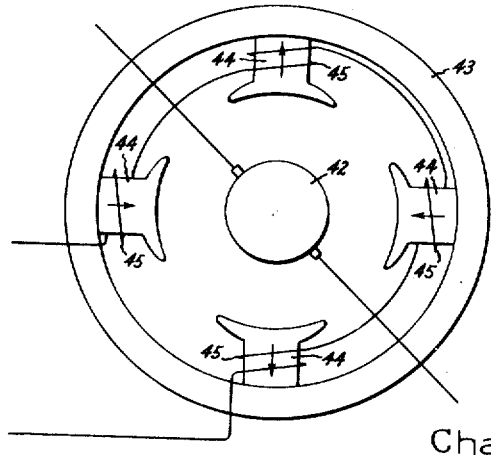

In the drawing, Fig. 1 is a schematic diagram of an armature reaction excited dynamo-electric machine provided with an embodiment of my improved excitation system and core; and Fig. 2 is a schematic diagram of a conventional salient pole direct current dynamo-electric machine embodying my invention.

Referring to the drawing, I have shown in Fig. 1 an armature reaction excited dynamo-electric machine arranged as a generator provided with a rotatable member or armature 10 having a commutator connected to an armature winding of the conventional direct current type and adapted to be driven at substantially constant speed by any suitable source of mechanical power. For illustrative purposes, the machine is shown as having a two-pole excitation system which comprises four stationary member pole pieces 11, 12, 13, and 14 connected together by the main core portion 15 of the stationary member. With this type excitation system, each pole comprises two pole pieces and the armature is provided with a set of primary brushes 16 and 17, and a quadrature field winding including the field winding coils 18, 19, 20, and 21 arranged about the pole pieces 11, 12, 13, and 14, respectively, is connected between the brushes of the primary brush set. A set of secondary brushes 22 and 23 also contacts the commutator of the armature 10 and is circumferentially displaced about the commutator from the primary brushes 16 and 17 and is adapted to provide a secondary circuit through the armature 10. In order to obtain a substantially balanced distribution of electric current through the various parts of the armature, the secondary brushes 22 and 23 are displaced substantially 90 electrical degrees from the primary brushes 16 and 17. The field winding coils 18 and 19 and the field winding coils 20 and 21, respectively, are connected in series, and these two groups of coils are connected in parallel with each other across the primary brushes 16 and 17 providing substantially a short circuit between the primary brushes, such that a very small amount of the flux is required to induce a voltage between these brushes to build up a relatively large primary current through that part of the armature which is connected between these brushes. This primary current will produce a component of armature reaction magnetic flux along the primary commutating axis, as indicated by the arrow 24. The quadrature field windings 18, 19, 20, and 21 are adapted to provide a component of magnetic excitation along the primary commutating axis substantially in the same direction as the primary armature reaction, as indicated by the arrows in the drawing, to assist in providing this primary or main load component of excitation to the machine. As the armature 10 rotates, the conductors connected between the secondary brushes 22 and 23 will cut the primary excitation flux and a voltage will be induced between these secondary brushes. If these brushes are connected to a load, a secondary or load current will flow through the secondary circuit of the armature and produce a secondary component of armature reaction along the commutating axis of these brushes in electrical quadrature with the primary or main load component of excitation, as indicated by the arrow 25 in the drawing.

In order to control the secondary or load characteristics of the generator, a field exciting winding including winding coils 26, 27, 28, and 29 arranged about pole pieces 11, 12, 13, and 14, respectively, is adapted to provide a component of magnetic excitation along the secondary commutating axis of the machine in opposition to the secondary armature reaction 25, as indicated by the arrows in Fig. 1, when energized as shown in the drawing. The energization of these field exciting winding coils may be controlled by any suitable means, such as a variable resistor 30, for varying the control excitation along the secondary commutating axis. The control field exciting winding coils 26 and 27 are mounted on the pole pieces 11 and 12, so as to provide a component of excitation to these pole pieces acting in substantially the same direction with respect to the secondary commutating axis of the armature, and the control field exciting winding coils 28 and 29 are arranged about the pole pieces 13 and 14, respectively, to provide the same polarity to each of these pole pieces and to provide poles of opposite polarity with respect to that of the pole pieces 11 and 12. The excitation provided by these control field exciting windings induces an electromotive force in the armature winding between the primary brushes 16 and 17 and the excitation provided by these four field exciting winding coils on the four pole pieces of the machine is, in effect, the same as that which would be provided by two pole pieces along the commutating axis of the secondary brushes 22 and 23. By providing separate pole pieces, as shown in the drawing, or by providing a distributed winding with a slot formed along the axis of the secondary brushes, the commutation of the machine is improved as the flux cut by the conductors directly connected to the brushes is thereby reduced.

The sensitivity of the control provided by the excitation of the control field exciting winding can be increased by reducing the secondary armature reaction flux which is opposed to the excitation provided by this winding. The secondary armature reaction component of flux is adapted to be reduced by providing a compensating field exciting winding including the compensating field exciting winding coils 31 and 32, and 33 and 34, arranged about the pole pieces 11 and 12, and 13 and 14, respectively, so as to provide compensating components of excitation as indicated by the arrows 35, 36, 37, and 38, respectively, in opposition to the secondary component of armature reaction 25. In order substantially to neutralize this secondary component of armature reaction, the field exciting winding coils 31, 32, 33, and 34 are connected in series with the secondary brush 22, such that the energization of these windings is responsive and substantially proportional to the secondary or load current of the machine. Commutation along the secondary commutating axis of the machine is improved by providing a commutating field exciting winding 39 connected in series with the secondary brush 22 through the field exciting windings 32 and 34 to provide a secondary commutating component of excitation, as indicated by the arrow 40.

With the compensating field exciting winding arrangement described above, the energization of the control field exciting winding need be relatively very small to obtain the desired control component of magnetic flux for the machine. The main load excitation component of magnetic flux along the primary commutating axis of the machine is a relatively large component of magnetic excitation as compared to the control component of excitation, and it is desirable, therefore, that the reluctance of the magnetic path through the machine core to the relatively large main load component of excitation should be as small as possible. In order to obtain this result, the laminated stationary member core 15 is formed of ferro-magnetic material having a granular formation and crystalline arrangement such that the maximum, or at least a greater, magnetic orientation of the material is substantially in the direction of the primary or main load excitation component of magnetic flux, as indicated by the arrow 41, with a resultant minimum or lesser magnetic orientation substantially in the direction of the secondary armature reaction.

Fig. 2 illustrates a conventional direct current dynamo-electric machine provided with an armature or rotatable member 42 and a stationary member having a main frame 43 of magnetic material and salient pole pieces 44 formed of magnetic material and adapted to be excited by field exciting windings 45 arranged about these pole pieces. The passage of current through the armature 42 will produce two components of armature reaction as in any conventional direct current dynamo-electric machine, one of which will be opposed to the main load excitation component of magnetic flux produced by the salient pole pieces 44, and the other component of which will be in quadrature with the excitation produced by the stationary salient field pole pieces 44. The operation of the machine will be improved by reducing to a minimum the cross-magnetizing or quadrature component of armature reaction. In this construction, the salient pole pieces 44 are formed of laminated ferro-magnetic material having granular formation and crystalline arrangement such that the greater or maximum magnetic orientation is substantially in the direction of the main load excitation component of magnetic flux set up in these pole pieces by the field exciting windings 45, as shown by the arrows in the drawing, and the minimum or lesser magnetic orientation is substantially in a direction in quadrature with this main load excitation component of magnetic flux; that is, in a direction transverse of the axis of the pole pieces and substantially parallel to the faces of these pole pieces, so as to offer a maximum magnetic reluctance to the quadrature or cross-magnetizing component of armature reaction. This arrangement tends to minimize the distortion of the distribution of magnetic flux in the pole pieces resulting from the quadrature component of armature reaction, and also minimizes the effect of eddy currents in the pole faces of the stationary pole pieces, thereby increasing the efficiency of the machine.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A core of ferro-magnetic material for a dynamo-electric machine having an armature, said core being adapted to provide magnetic field poles for the machine comprising material having maximum magnetic orientation substantially in the direction of the main load excitation component of magnetic flux and minimum magnetic orientation substantially in the direction of armature reaction in quadrature with the main load excitation component of magnetic flux.

2. A core of laminated magnetic material for a dynamo-electric machine, said core including pole pieces providing magnetic field poles for the machine formed of material having greater magnetic orientation substantially in the direction of the main load excitation component of magnetic flux and lesser magnetic orientation substantially in the direction of armature reaction in quadrature with the main load excitation component of magnetic flux of said pole pieces.

3. A core of magnetic material for an armature reaction excited dynamo-electric machine having an armature, said core being adapted to provide magnetic field poles for the machine comprising material having greater magnetic orientation substantially in the direction of the main load excitation component of magnetic flux and lesser magnetic orientation substantially in the direction of the component of armature reaction in quadrature with the main load excitation component of magnetic flux.

4. A core of laminated magnetic material for an armature reaction excited dynamo-electric machine having an armature, said core being adapted to provide magnetic field poles for the machine comprising material having maximum magnetic orientation substantially in the direction of the main load excitation component of armature reaction and minimum magnetic orientation substantially in the direction of the component of armature reaction in quadrature with the main load excitation component of armature reaction.

5. An excitation system for a dynamo-electric machine having an armature including a core of magnetic material adapted to provide magnetic field poles for the machine, and a field exciting winding on said core, said core material being arranged with greater magnetic orientation substantially in the direction of the main load excitation component of magnetic flux and lesser magnetic orientation substantially in the direction of armature reaction in quadrature with the main load excitation component of magnetic flux.

6. An excitation system for a dynamo-electric machine having an armature including a stationary core member of magnetic material provided with laminated field pole pieces and a control field exciting winding on said pole pieces, said core material being arranged with maximum magnetic orientation substantially in the direction of the main load excitation component of magnetic flux and minimum magnetic orientation substantially in the direction of armature reaction in quadrature with the main load excitation component of magnetic flux in said pole pieces.

7. An excitation system for a dynamo-electric machine having an armature including a stationary core member of magnetic material provided with salient field pole pieces, and a field exciting winding on said pole pieces, said pole piece material being arranged with greater magnetic orientation substantially in the direction of the main load excitation component of magnetic flux provided by said field exciting winding and lesser magnetic orientation substantially in the direction of armature reaction in quadrature with the main load excitation component of magnetic flux in said pole pieces.

8. An excitation system for an armature reaction excited dynamo-electric machine having an armature including a stationary core member of magnetic material adapted to provide magnetic field poles for the machine, and a control field exciting winding on said core, said core material being arranged with greater magnetic orientation substantially in the direction of the main load excitation component of magnetic flux and lesser magnetic orientation substantially in the direction of armature reaction in quadrature with the main load excitation component of magnetic flux and in the direction of the component of excitation provided by said control field exciting winding.

9. An excitation system for a dynamo-electric machine having an armature including a stationary core member of magnetic material adapted to provide magnetic field poles for the machine, a control field exciting winding on said core, said core material being arranged with greater magnetic orientation substantially in the direction of the main load excitation component of magnetic flux and lesser magnetic orientation substantially in the direction of armature reaction in quadrature with the main load excitation component of magnetic flux and in the direction of the component of excitation provided by said control field exciting winding, and a compensating field exciting winding arranged substantially to neutralize the component of armature reaction in quadrature with the main load excitation component of magnetic flux.

CHARLES A. THOMAS.